United States Patent
Chapman et al.

(10) Patent No.: US 8,774,217 B2
(45) Date of Patent: Jul. 8, 2014

(54) TIME DOMAIN DUPLEX BETWEEN CMTS AND CABLE MODEMS

(75) Inventors: John T. Chapman, Laguna Nigel, CA (US); Alon Bernstein, Monte Sereno, CA (US); Leo Montreuil, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 13/288,177

(22) Filed: Nov. 3, 2011

(65) Prior Publication Data
US 2013/0114480 A1   May 9, 2013

(51) Int. Cl.
*H04J 3/16* (2006.01)
(52) U.S. Cl.
USPC ............ 370/468; 370/392; 370/294; 370/282
(58) Field of Classification Search
None
See application file for complete search history.

(56) References Cited

U.S. PATENT DOCUMENTS

| | | | |
|---|---|---|---|
| 7,748,002 B1 | 6/2010 | Beser | |
| 2003/0202534 A1* | 10/2003 | Cloonan | 370/468 |
| 2006/0088056 A1* | 4/2006 | Quigley et al. | 370/468 |

* cited by examiner

*Primary Examiner* — Duc C Ho
(74) *Attorney, Agent, or Firm* — Edell, Shapiro & Finnan, LLC

(57) ABSTRACT

A time domain duplex cable system includes a mechanism to change the communication direction of spectrum used in a cable plant including a Cable Modem Termination System (CMTS), a Fiber Node and a plurality of cable modems in communication with the CMTS via the Fiber Node. Active devices, e.g., directional amplifiers switch the communication direction of the cable plant in response to timing information received from the CMTS. To avoid collisions of downstream and upstream packets, a guard time is determined and used in connection with generating the timing information. In one embodiment, the timing information is transmitted in one or more Data Over Cable Service Interface Specifications (DOCSIS) Media Access Protocol (MAP) messages transmitted by the CMTS towards the cable modems.

21 Claims, 6 Drawing Sheets

TIME DOMAIN DUPLEX BETWEEN CMTS AND CABLE MODEMS

TECHNICAL FIELD

The present disclosure relates to controlling traffic in an electronic communications system.

BACKGROUND

There is ever-increasing consumer demand for services, such as data, voice, and video, to be delivered over broadband communications systems. Cable modem technology is one method of providing such broadband services to subscribers. In the 1980s, cable television providers built out significant physical plants that resulted in millions of individual customer premises being connected (or "wired") directly with a cable headend system from which cable television programming was broadcast. Over time, it was realized that the connectivity between the headend system and customers could be leveraged to supply additional services such as on-demand television programming, as well as more sophisticated voice and data services.

The Data Over Cable Service Interface Specifications ("DOCSIS") standard specifies the transfer of Internet Protocol (IP) traffic, between the cable headend system and customer locations, over an all-coaxial or a hybrid-fiber/coax (HFC) cable network. In many cable systems, DOCSIS enables the more sophisticated voice and data services to be delivered to customer premises. The communication infrastructure in a DOCSIS implementation may include a Cable Modem Termination System (CMTS) at the cable headend, and a Cable Modem (CM) at each customer location. With this basic architecture, DOCSIS can deliver IP traffic to a cable modem, enabling a given customer to enjoy any service that such an IP connection can provide including, but not limited to, Internet browsing service, telephony service, as well as television service, perhaps in the form of IP television (IPTV). In the context of DOCSIS, the spectrum used by cable system service providers has generally included, in the United States, a 50-870 MHz forward or downstream band and a 5-42 MHz reverse or upstream band. The downstream band is used by the CMTS to deliver the services requested by customers (television, etc.) toward respective cable modems, whereas the upstream band is used by the respective cable modems to communicate with the CMTS, thus enabling, e.g., a computer at the customer premises to communicate with, e.g., third party web servers with which the CMTS is able to communicate. In light of the large number of fielded CMs, a CMTS is configured with a scheduler that communicates with all of the CMs and notifies the CMs as to when they can respectively communicate upstream in an allocated predefined time slot, in, e.g., a time division multiple access (TDMA) manner (although orthogonal frequency division multiple access (OFDMA) can also be used by the CMs).

DESCRIPTION OF EXAMPLE EMBODIMENTS

Overview

A method for effecting time domain duplex in a cable plant includes controlling, based on information received from a Cable Modem Termination System, an active directional device that is in a communication path between the Cable Modem Termination System and a plurality of cable modems, to be oriented for downstream communication from the Cable Modem Termination System to the cable modems, for a first predetermined amount of time, and then again controlling the active directional device to be oriented for upstream communication from the cable modems to the Cable Modem Termination System over a same bandwidth as the downstream communication, for a second predetermined amount of time, after the first predetermined period of time. This enables the entirety of a given bandwidth to be employed for both downstream and upstream communication. A guard time between downstream and upstream communication may be calculated and employed in timing control information sent to the active directional device to account for the time downstream and upstream packets take to be come off of the cable plant network. In one embodiment, the timing control information is supplied to active directional device using one or more Data Over Cable Service Interface Specifications (DOCSIS) Media Access Protocol (MAP) messages.

Example Embodiments

Figure 1:
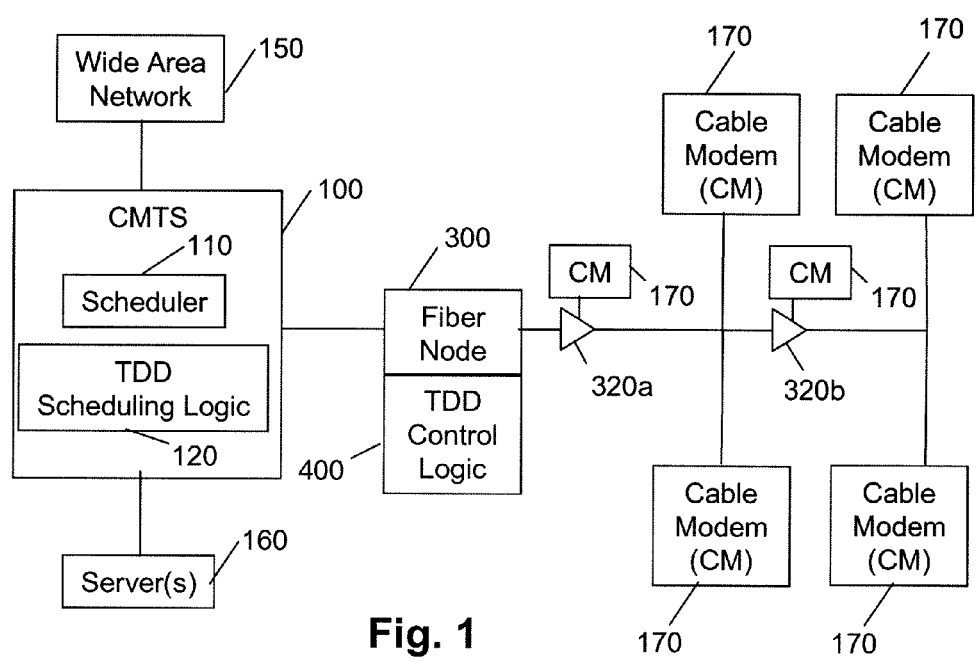
FIG. 1 depicts a block diagram of a network topology that supports Time Division Duplex (TDD) communication between a CMTS and a plurality of cable modems.

FIG. 1 depicts a block diagram of a network topology and components that support Time Division Duplex (TDD) communication between a Cable Modem Termination System (CMTS) and a plurality of cable modems. As shown, a CMTS 100 includes a Scheduler 110 and TDD Scheduling Logic 120, the latter of which will be described more fully later herein. The CMTS 100 is connected to a Wide Area Network 150, which might include connectivity to, e.g., the Internet. The CMTS 100 may also be in communication with one more or more servers 160, including, but not limited to, a Dynamic Host Configuration Protocol (DHCP) server, a File Transfer Protocol (FTP) server, and a Time of Day (ToD) server, among others.

The CMTS 100 is also in communication with a Fiber Node 300 that is connected to multiple cable modems (CMs) 170. Each CM 170 is disposed, in many applications, at a customer premises, such as a home, and is configured to supply customer premises services such as Internet connectivity, and television and telephone service, among other possible service offerings.

The connection between the CMTS 100 and the Fiber Node 300 is often implemented with fiber optic cable, whereas the connection between the Fiber Node 300 and the respective CMs 170 is often implemented with coaxial cable.

The Fiber Node 300 bridges the optical (fiber optic) and electrical (coaxial) infrastructure enabling data to pass seamlessly from the CMTS 100 to the respective CMs 170, and from the respective CMs 170 to the CMTS 100. As further shown in FIG. 1, the Fiber Node 300 may include TDD Control Logic 400, which, as will be explained more fully later herein, enables the CMTS and CMs to communicate with each other in a Time Division Duplex (TDD) manner for both downstream and upstream directions over shared bandwidth. A trunk amplifier or active device 320a and a line amplifier or active device 320b are further shown in the drawing. TDD Control Logic 400 can also be employed by these two devices to effect TDD communication in the cable plant. In this regard, amplifiers 320a and 320b are shown having attached cable modems. The communication capabilities of those cable modems (which are, e.g., not in a customer premises) can be leveraged to enable the amplifiers 320a and 320b to receive instructions from, e.g., TDD scheduling logic 120 as will be explained in more detail below.

In many cable systems implementing DOCSIS, the spectrum used by cable system service providers has generally included, in the United States, 50-870 MHz forward or downstream band and a 5-42 MHz reverse or upstream band. The frequency separated downstream band is used by the CMTS 100 to deliver the services requested by customers, whereas the frequency separated upstream band is used by the respective CMs 170 to communicate with the CMTS 100 (as well as entities with which the CMTS 100 can communicate via the Wide Area Network 150). In light of the large number of fielded CMs 170 (perhaps thousands or even tens of thousands) supported by a single CMTS 100 via, e.g., multiple Fiber Nodes 300, a CMTS 100 operates in conjunction with Scheduler 110 to notify the CMs 170 as to when they can respectively communicate upstream in an allocated predefined time slot, in, e.g., a time division multiple access (TDMA) manner.

More specifically, in one possible implementation, the Scheduler 110 allocates time slots to individual CMs 170 for upstream communication, and the CMTS 100 sends DOCSIS compliant Media Access Protocol (MAP) messages including slot information provided by the Scheduler 110 downstream for receipt by all of the CMs 170. In this way, each CM 170 that has requested a time slot can be allocated a specific slot for upstream communication. Recall that in many applications, the upstream channel is a pre-designated bandwidth that is totally separate from the downstream channel, which has its own pre-designated bandwidth. In other words, the scheduler 110 is configured to schedule slots only in upstream communication to preclude the respective CMs from interfering with one another. However, in accordance with an embodiment that enables TDD communication between the CMTS 100 and CMs 170 over shared bandwidth, TDD Scheduling Logic 120 is configured to schedule both upstream and downstream traffic over the same bandwidth. This is accomplished, as will be explained more fully, by having TDD aware active components in the cable plant. These active components may include amplifiers whose direction of operation can be controlled based on instructions received from TDD Control Logic 400 or directly from TDD Scheduling Logic 120 at the CMTS 100. In other words, the amplifier(s) in the Fiber Node 300 and/or the trunk and line amplifiers 320a, 320b can be configured to have two states: a first state, in which all communication for a given bandwidth is downstream (perhaps this is a default, or fail safe, state) and a second state, in which all communication for the given bandwidth is upstream. Thus, in accordance with TDD communication between the CMTS 100 and CMs 170, all communication is either downstream or upstream over the same given bandwidth.

Figure 2:
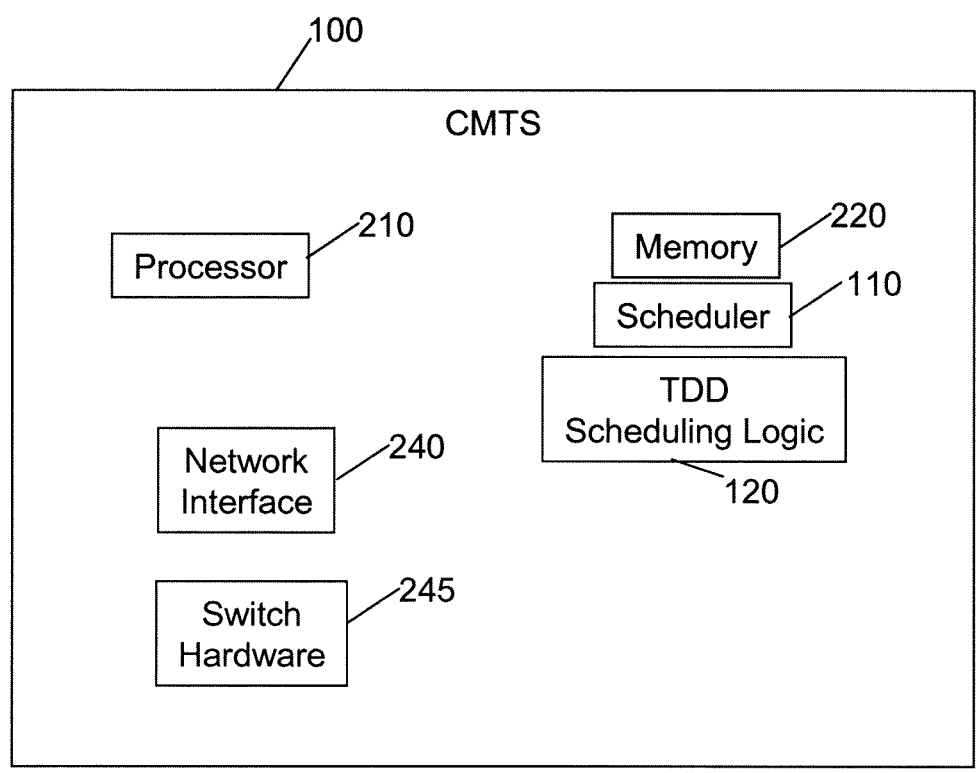
FIG. 2 depicts an example CMTS with a scheduler and associated TDD Scheduling Logic that is configured to maintain system wide timing control for TDD communication.

FIG. 2 depicts an example CMTS 100 with a Scheduler 110 and associated TDD Scheduling Logic 120 that maintains system wide timing control for TDD communication between the CMTS 100 and CMs 170. CMTS 100 may comprise a processor 210 and associated memory 220, which may include program logic or instructions for implementing the functionality of the Scheduler 110 and TDD Scheduling Logic 120. CMTS 100 also includes a network interface unit 240, such as a network interface card for, e.g., communicating with WAN 150, among other entities. Switch hardware 245 may also be included and may comprise one or more application specific integrated circuits and supporting circuitry to buffer/queue incoming packets and route the packets over a particular port to a destination device. The switch hardware 245 may include its own processor that is configured to apply class of service, quality of service and other policies to the routing of packets. In addition, CMTS 100 includes a suitable optical port (not shown) that enables optical connectivity with, e.g., Fiber Node 300.

Processor 210 may be a programmable processor (microprocessor or microcontroller) or a fixed-logic processor. In the case of a programmable processor, any associated memory (e.g., 220) may be of any type of tangible processor readable memory device (e.g., random access, read-only, etc.) that is encoded with or stores instructions that can implement the TDD Scheduling Logic 120. Alternatively, processor 210 may be comprised of a fixed-logic processing device, such as an application specific integrated circuit (ASIC) or digital signal processor that is configured with firmware comprised of instructions or logic that cause the processor to perform the functions described herein. Thus, TDD scheduling Logic 120 may be encoded in one or more tangible computer readable storage media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in one or more processor- or computer-readable storage media that is encoded with instructions for execution by a processor that, when executed by the processor, are operable to cause the processor to perform the functions described herein.

Figure 3:
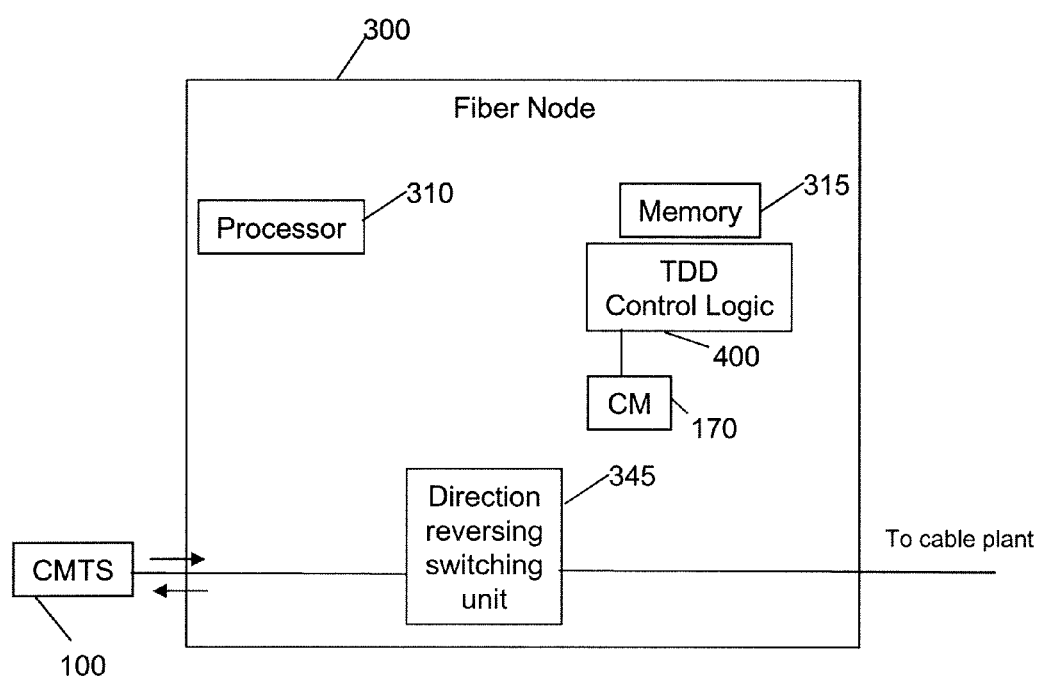
FIG. 3 depicts an example Fiber Node including TDD Control Logic and cable plant direction reversing switching.

FIG. 3 depicts an example Fiber Node 300 including TDD Control Logic 400 and cable plant direction reversing switching unit 345. Fiber Node 300 may comprise a processor 310 and associated memory 315, which may include program logic or instructions for implementing the functionality of TDD Control Logic 400. Processor 310 may be a programmable processor (microprocessor or microcontroller) or a fixed-logic processor. In the case of a programmable processor, any associated memory (e.g., 315) may be of any type of tangible processor readable memory device (e.g., random access, read-only, etc.) that is encoded with or stores instructions that can implement the TDD Control Logic 400. Alternatively, processor 310 may be comprised of a fixed-logic processing device, such as an ASIC or digital signal processor that is configured with firmware comprised of instructions or logic that cause the processor to perform the functions described herein. Thus, TDD Control Logic 400 may be encoded in one or more tangible computer readable storage media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. As with CMTS 100, any process logic incorporated into Fiber Node 300 may be embodied in one or more processor- or computer-readable storage media that is encoded with instructions for execution by a processor that, when executed by the processor, are operable to cause the processor to perform the functions described herein. FIG. 3 also shows that the CMTS 100 communicates with Fiber Node 300 over a two-way communication medium such as two wavelengths over a single fiber optic cable, or via two separate fiber optic cables.

As noted, Fiber Node 300 may include direction reversing switching unit 345, which may be implemented, in one possible embodiment, as a directionally controlled amplifier or amplifiers. Such directionally controlled amplifiers may also be deployed as amplifiers 320*a*, 320*b* in the downstream cable plant. The function of the direction reversing switching unit 345 is to switch the bandwidth over which communication is occurring between the CMTS 100 and CMs 170 to be in the downstream direction or the upstream direction, responsive to instructions or control information received from TDD Control Logic 400 (or directly from messages sent from the CMTS 100). Relatively precise timing control is desirable to ensure that, e.g., the CMTS 100 is not transmitting downstream while the direction reversing switching 345 is configured for upstream communication. The functionality described with respect to the direction reversing switching unit 345 is equally applicable to the trunk and line amplifiers 320*a*, 320*b* that are deployed throughout the cable plant.

To implement TDD communication between the CMTS 100 and CMs 170 in the context of the components and topology described thus far with respect to FIGS. 1-3, two basic functions are provided: an appropriate scheduling mechanism and guard time determination. As for the appropriate scheduling mechanism, the CMTS 100, via Scheduler 110 and TDD Scheduling Logic 120, in this embodiment, schedules the entire TDD spectrum as one media, including downstream communication as well as upstream communication. In this regard, downstream communication can now be considered, from a scheduling perspective, as another cable modem 170, wherein the downstream is allocated a certain fixed amount time, or time slot, during which downstream communication is permitted.

In order to avoid collision between upstream and downstream communication and ensure that downstream communication reaches its intended destination before the cable plant switches direction using the direction reversing switching unit 345 and/or trunk and line amplifiers 320*a*, 320*b*, an amount of guard time is introduced between downstream and upstream communication periods. In one possible embodiment, a ranging mechanism is implemented at cable system set up time, and periodically thereafter, to set the guard time. Notably, there is a different guard time employed before/after CMTS downstream transmissions and CM upstream transmission, compared to between each CM upstream transmission. This different guard time can account for, among other things, time used to switch the direction of the cable plant.

More specifically, in accordance with an embodiment, and taking guard time first, a guard time between the CMTS and the collective CMs 170 is implemented to allow a downstream packet to get off the network before an upstream packet is placed on the network by one of the CMs 170. This guard time is approximately equal to the propagation time of the coax segment of the hybrid fiber coax network since it is only the coax segment that is two way (since the fiber optic segment of the hybrid-fiber/coax system has ample bandwidth to accommodate TDD communication between the CMTS 100 and perspective CMs 170). Thus, in one embodiment, guard time setting can be based on measured activity at the Fiber Node 300. For example, TDD Control Logic 400 can implement a calibration sequence in connection with ranging between the CMTS 100 and CMs 170.

As those skilled in the art will appreciate, when a new CM 170 is powered up in the network it performs a sequence of steps to register itself with the CMTS 100. As part of those steps, the CM 170 sends an Initial Ranging request towards the CMTS 100 and waits for a Range-Response from the CMTS 100. If no response is received, the CM 170 repeats the transmission of the request, but does so at an increased power level. Once a response from the CMTS 100 is received, the CM 170 knows that the CMTS 100 has heard the CM 170, and can thereafter transmit at the last power level attained. Because the CMTS 100 is responsible for keeping system wide time in DOCSIS, CMTS 100 can also determine the propagation time, and thus distance or range to any given CM since at least some messages transmitted by the CMs include the system time. The difference between the time a message or packet is sent from a CM 170 and the time that message or packet is received by the CMTS 100 is the propagation time to/from the CMTS 100 or CM 170.

Leveraging this ranging mechanism, and in accordance with one possible embodiment, the TDD Control Logic 400 in the Fiber Node 300 is configured to send an echo packet in the upstream immediately after detection of a ranging packet sent by the CMTS. The echo packet may be generated with zero guard time. The CMTS 100 receives the echo packet and then calculates the delay between itself and the Fiber Node 300. Knowing the range or propagation time to the Fiber Node 300, and the total range or propagation to each of the CMs 170 enables the TDD Control Logic 400 or TDD Scheduling Logic 120 to set a guard time between upstream and downstream communication that takes into account the propagation time from the Fiber Node 300 to, e.g., the furthest CM 170 in the system served by a given Fiber Node 300. It is noted that the TDD mechanism is applicable to the part of the cable plant that is downstream from the Fiber Node 300. Upstream from the Fiber Node 300 to the CMTS 100, one or multiple fiber optic cables can handle simultaneous bi-directional traffic.

Another way to determine the propagation time to a Fiber Node 300 is to configure the Fiber Node 300, and particularly the TDD Control Logic 400, to include functionality that is similar to a Cable Modem 170 in regard to registering and ranging. Thus, instead of being configured to send an echo packet, as described above, the TDD Control Logic 400 could be configured to send a Ranging Request (or some similar message) to the CMTS 100. The CMTS could then determine range to the Fiber Node 300 similarly to how range to a CM 170 can be determined.

In a practical implementation it may be prudent to identify the CM 170 that is the furthest from the Fiber Node (FN) 300 and calculate guard time based on that CM. Also, as noted earlier, guard time can also take into account any switching time in connection with switching the cable plant from one direction to another.

Thus, one possible formula for calculating guard time may be:

$$\text{Guard time} = \text{Twice the propagation time from FN to furthest CM} + \text{direction switching time}$$

This guard time is then taken into consideration when the Scheduler 110 and TDD Scheduling Logic 120 generate and provide scheduling information that is used by the CMs 170 to identify slots for upstream communication, as well information that instructs the TDD Control Logic 400 to control direction reversing switching unit 345.

To effect the switching of a given bandwidth for upstream and downstream communications, direction reversing switching unit 345 may include TDD "aware actives," i.e., active devices. These actives may be, e.g., bi-directional amplifiers. The direction of a given amplifier can be driven by a circuit controlled from TDD Control Logic 400 that monitors DOCSIS MAP messages (including information indicative of cable pant switching time) sent from the CMTS 100 and causes the amplifier(s) to switch direction. Cable modem functionality may therefore be included within the fiber node 300 to monitor and respond to DOCSIS MAP messages. Similarly, trunk and line amplifiers 320a, 320b may be controlled directly by TDD Control Logic 400 or CMTS 100 (via, e.g., out of band messaging) or, instead, may be controlled by providing the amplifiers 320a, 320b functionality of a CM 170 sufficient to monitor and respond to DOCSIS MAP messages.

Switching can be implemented with two separate amplifiers, connected in opposite directions or with a single reversible amplifier. In the former case, the nodes of the amplifiers may be connected using single pole, single throw (SPST) switches, or in the latter case with a single pole double throw (SPDT) switch at either end to reverse the input and output nodes of the single amplifier.

It is noted that OFDMA allows simultaneous transmission of messages from CMs 170. However, when an amplifier is caused to switch in the downstream direction in the TDD approach disclosed herein, then the CMTS 100 may be given entire spectrum over which to transmit. This could be a very wide bandwidth.

Figure 4:
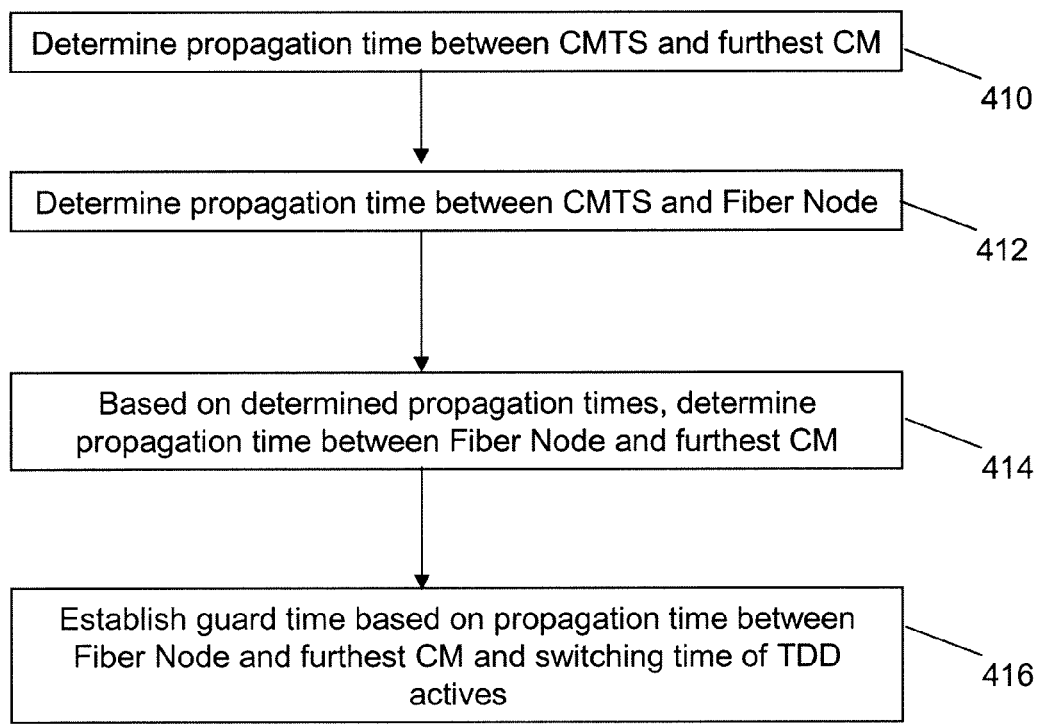
FIG. 4 is a flow chart depicting an example series of operations for determining guard times to be implemented between downstream and upstream communications in the cable plant.

Reference is now made to FIG. 4, which is a flow chart depicting an example series of operations or steps for determining a guard time to be implemented between downstream and upstream communications in a cable plant. As shown in FIG. 4, at 410, a propagation time from the CMTS 100 to the furthest CM 170 is determined. This can be accomplished using ranging techniques used in registering a CM 170 upon power up as well as periodically while CMs 170 are operational. At 412, the propagation time between the CMTS and the Fiber Node is determined. This propagation time can be determined using any one of multiple techniques including using ranging techniques that are employed by a CM in connection with determining a CM's distance from a CMTS. Alternatively, the Fiber Node can implement the echo packet technique described previously.

Regardless of how the propagation times between the CMTS and CM, and between the CMTS and Fiber Node are determined, the process depicted in FIG. 4 proceeds to 414. At this next operation, the propagation time between the Fiber Node and furthest CM is determined. It is based on this latter propagation time that the guard time may be calculated. That is, as shown at 416, the guard time that is used to ensure that upstream and downstream communications do not overlap is determined by the propagation time between the Fiber Node and the, e.g., furthest, CM as well as the switching time of the TDD active components in the system. This guard time is then used, for example, by TDD Scheduling Logic 120 to schedule timing for upstream and downstream communications.

Figure 5:
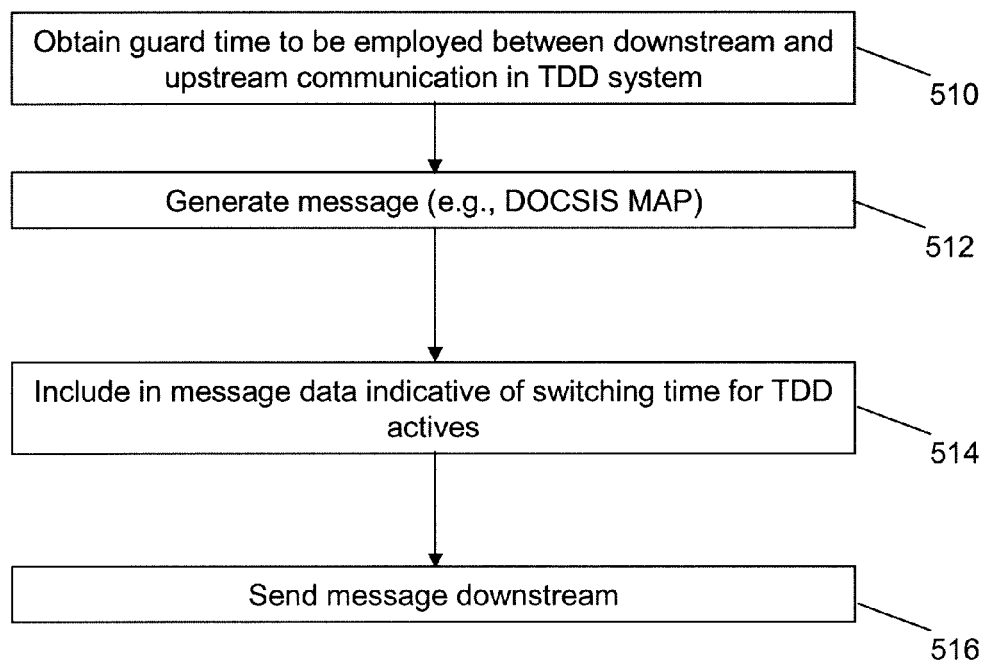
FIG. 5 is a flow chart depicting an example series of operations that may be performed by the Scheduler and TDD Scheduling Logic associated with the CMTS to generate a DOCSIS MAP message that can be used to control the direction of the cable plant.

FIG. 5 is a flow chart depicting an example series of operations that may be performed by the Scheduler 110 and TDD Scheduling Logic 120 associated with the CMTS 100 to generate a DOCSIS MAP message that is used to control the direction of the cable plant.

More specifically, and as shown in FIG. 5, the guard time to be employed between downstream and upstream communications in the TDD approach described herein, is obtained. Again, it is not critical as to how the guard time is calculated but rather that a guard time is available for use since, as described previously, the amount of guard time needed between a change over from downstream communications to upstream communications is different from an amount of guard time that is needed between respective bursts from individual CM's that are sharing the same upstream spectrum. Thus, at 510, the guard time that is to be employed between the downstream and upstream communication directions is obtained. At 512, a DOCSIS MAP message is generated. Such a MAP message, under present DOCSIS standards is used to allocate time slots for individual CMs to communicate upstream to avoid multiple CMs from communicating simultaneously in the upstream channel.

In accordance with an embodiment of the TDD approach described herein, and as shown at 514, the DOCSIS MAP message is configured to include data that is indicative of switching timing for TDD actives that may be deployed in the cable plant. In accordance with one possible implementation, the TDD actives monitor the DOCSIS MAP messages sent by the CMTS 100, at 516, and respond accordingly.

Figure 6:
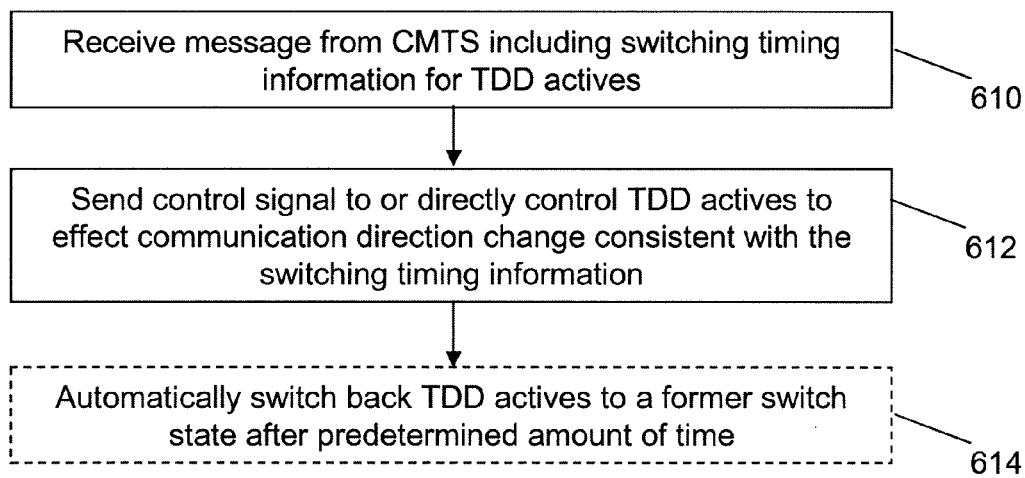
FIG. 6 is a flow chart depicting an example series of operations that may be performed by a Fiber Node or other device in the cable plant in response to a communication from the CMTS to change the communication direction of the cable plant.

FIG. 6 is a flow chart depicting an example series of operations that may be performed by a TDD Control Logic 400 (which may also reside in individual trunk and line amplifiers 320a, 320b) in response to a communication from the CMTS to change the direction of the cable plant. At 610, a message from the CMTS, such as a DOCSIS MAP message, is received or detected. The message includes information indicative of switch timing for TDD actives. Although the timing information has been described herein as being delivered via a DOCSIS MAP message, it is also contemplated (as mentioned) that a separate, in-band or out-of-band, signaling mechanism could provide similar information. In the DOCSIS context, MAP messages are already being supplied downstream from the CMTS, and thus since TDD timing is another form of scheduling or time slot allocation, it may be a natural fit to include TDD timing information in such messages.

At 612, control signals are sent to the TDD actives that are responsible for switching the direction of the cable plant. The control signals are configured to control the TDD actives to effect communication direction change consistent with the switch timing information supplied by the CMTS. At 614, which may be optionally implemented depending on the selected design of the system, the TDD actives are automatically switched back to their former state after a predetermined amount of time. That is, rather than having to receive another message from the CMTS 100 containing information or data indicative of a direction change, a single message may be provided that includes information regarding when to switch, as well as how long (the "predetermined amount of time") to remain in the switched state. After that predetermined amount of time, the TDD actives can be configured to automatically switch back to their original or default state (direction). As a practical example, and as mentioned previously, the TDD actives can be configured to be in a first or default state, which is downstream. Switch timing information (e.g., included in a DOCSIS MAP message) would cause the TDD actives to switch the cable plant such that the communication direction is upstream, enabling the CMs 170 to communicate with the CMTS in their respective slots (or via OFDMA). This would be the second state for the TDD actives. Then, after the predetermined amount of time, without receipt of a further message, the TDD actives can be configured to return to the first state, such that the cable plant is again configured to be in the downstream direction.

The TDD communication approach described herein may have unique applicability to existing DOCSIS implementations, or to new spectrum that might become available for DOCSIS implementations, such that both frequency division duplex (FDD) and TDD communication may be present in a given cable system. That is, a TDD communication regime could be deployed above, e.g., 1 GHz, where an FDD regime would be deployed up to, e.g., 870 MHz. In such a case, a triplexer might be deployed at the Fiber Node 300 to handle the two frequency bands for downstream and upstream communication in the FDD system, and a separate third frequency band (e.g., 1-2 GHz) for the TDD system.

One particular advantage of the TDD approach described herein is as follows. In a Frequency Division Duplex system, a spectrum keep out zone is often employed between the downstream and upstream spectrums. At 1 GHz, this keep out zone can be as much as 300 MHz, which spectrum is not available for communication. Adding just one new downstream above 1 GHz would result in the 300 MHz loss. Adding a second downstream above 1 GHz would waste another 300 MHz (and potentially more since the keep out zone might need to be larger at the higher frequency). Thus, a FDD system at this frequency can waste upwards of 50% of the available bandwidth, whereas the TDD approach described herein may not suffer from such potential bandwidth waste. As a specific example, consider adding a new service in the 1000 to 2000 MHz band (above an upstream/downstream split), assuming that about 25% of the bandwidth is lost in the transition band. Thus, one is left with a band from 1250 to 2000 MHz (750 MHz of bandwidth available) and, in a TDD system one would also lose the guard time (twice propagation delay). If a FDD implementation were employed, four separate bandwidths would be needed (the upstream/downstream split for below 1 GHZ, and the upstream/downstream split for above 1 GHz). For the above 1 GHz portion, and using 25% rule, one might end up with a system that has one direction from 1250 to 1444.44 MHz and another direction from 1805.56 to 2000 MHz in the other direction. Such FDD does not need a guard time but does lack flexibility in assigning bandwidth in either direction. Moreover, the FDD system has only 194.44 MHz in each direction for a total of 388.88 MHz of bandwidth (almost half of 750 MHz for the TDD system).

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
controlling, based on information received from a Cable Modem Termination System, an active directional device, which is in communication with a plurality of cable modems, to be oriented for downstream communication from the Cable Modem Termination System to the cable modems, for a first predetermined amount of time; and
controlling, based on the information received from the Cable Modem Termination System, the active directional device to be oriented for upstream communication from the cable modems to the Cable Modem Termination System over a same bandwidth as the downstream communication, for a second predetermined amount of time, after the first predetermined period of time.

2. The method of claim 1, wherein the information received from the Cable Modem Termination System is received as part of a Data Over Cable Service Interface Specifications (DOCSIS) Media Access Protocol (MAP) message.

3. The method of claim 1, further comprising generating a control signal configured to cause an amplifier to pass communication traffic in a direction consistent with the information received from the Cable Modem Termination System.

4. The method of claim 1, further comprising performing ranging between the Cable Modem Termination System and a fiber node to establish a propagation time between the Cable Modem Termination System and the fiber node.

5. The method of claim 1, further comprising sending an echo packet from a fiber node towards the Cable Modem Termination System with zero guard time after detecting a ranging packet destined for any one of the cable modems.

6. The method of claim 1, further comprising configuring active directional device to be in a default state that is oriented for downstream communications from the Cable Modem Termination System to the cable modems.

7. The method of claim 1, wherein the downstream and upstream communication are consistent with the Data Over Cable Service Interface Specifications Standard (DOCSIS).

8. An apparatus, comprising:
a processor;
memory in communication with the processor; and
an active directional device in communication with the processor,
wherein the apparatus is configured to be disposed between a Cable Modem Termination System and a plurality of cable modems,
wherein the processor is configured to control, based on information received from the Cable Modem Termination System, the active directional device to be oriented for downstream communication from the Cable Modem Termination System to the cable modems, for a first predetermined amount of time, and
control the active directional device to be oriented for upstream communication from the cable modems to the Cable Modem Termination System over a same bandwidth as the downstream communication, for a second predetermined amount of time, after the first predetermined period of time.

9. The apparatus of claim 8, wherein the processor is further configured to obtain the information from the Cable Modem Termination System from a Data Over Cable Service Interface Specifications (DOCSIS) Media Access Protocol (MAP) message.

10. The apparatus of claim 8, wherein the processor is further configured perform ranging with the Cable Modem Termination System.

11. The apparatus of claim 8, wherein the processor is further configured to send an echo packet towards the Cable Modem Termination System with zero guard time after detecting a ranging packet destined for any one of the cable modems.

12. A non-transitory computer-readable storage medium storing instructions that, when executed by a processor, cause the processor to:
control, based on information received from a Cable Modem Termination System, a direction reversing unit to be oriented for downstream communication from the Cable Modem Termination System to cable modems, for a first predetermined amount of time, and control the direction reversing unit to be oriented for upstream communication from the cable modems to the Cable Modem Termination System over a same bandwidth as the downstream communication, for a second predetermined amount of time, after the first predetermined period of time.

13. The non-transitory computer-readable storage medium of claim 12, wherein the instructions that cause the processor to control the direction reversing unit comprise instructions that cause the processor to obtain the information received from a Cable Modem Termination System from a Data Over Cable Service Interface Specifications (DOCSIS) Media Access Protocol (MAP) message.

14. The non-transitory computer-readable storage medium of claim 12, wherein the instructions that cause the processor to control the direction reversing unit comprise instructions that cause the processor to perform ranging with the Cable Modem Termination System.

15. A method, comprising:

obtaining a propagation time between a fiber node and a cable modem in a hybrid-fiber/coax cable system;

establishing, based at least in part on the propagation time, a guard time between (1) downstream communication from a Cable Modem Termination System and the cable modem and (2) upstream communication between the cable modem and the Cable Modem Termination System;

generating a message at the Cable Modem Termination System that includes data indicative of respective timing for downstream communication and upstream communication over a same bandwidth to effect time division duplex communication over the same bandwidth, the respective timing taking into account the guard time; and sending the message to at least the fiber node.

16. The method of claim 15, further comprising scheduling time slots for respective cable modems for upstream communication and including data indicative thereof in a Data Over Cable Service Interface Specifications (DOCSIS) Media Access Protocol (MAP) message.

17. The method of claim 15, further comprising receiving an echo packet, sent from a fiber node disposed between the Cable Modem Termination System and the cable modem, in response to a ranging packet transmitted downstream.

18. The method of claim 15, wherein the message is a Data Over Cable Service Interface Specifications (DOCSIS) Media Access Protocol (MAP) message.

19. An apparatus, comprising:

a processor;

memory in communication with the processor; and a network interface configured to receive packets and send packets over a cable television system, wherein the processor is configured to obtain a propagation time between a fiber node and a cable modem in the cable television system;

establish, based at least in part on the propagation time, a guard time between (1) downstream communication towards the cable modem and (2) upstream communication from the cable modem;

generate a message that includes data indicative of respective timing for downstream communication and upstream communication over a same bandwidth to effect time division duplex communication over the same bandwidth, the respective timing taking into account the guard time; and send the message to downstream towards the cable modem.

20. The apparatus of claim 19, wherein the processor is further configured to generate the message as a Data Over Cable Service Interface Specifications (DOCSIS) Media Access Protocol (MAP) message.

21. The apparatus of claim 19, wherein the processor is further configured to schedule time slots for respective cable modems for upstream communication and include data indicative thereof in the Data Over Cable Service Interface Specifications (DOCSIS) Media Access Protocol (MAP) message.

* * * * *